(12) United States Patent
Japertas

(10) Patent No.: US 12,548,059 B2
(45) Date of Patent: Feb. 10, 2026

(54) VISUAL SEARCH METHOD WITH FEEDBACK LOOP BASED ON INTERACTIVE SKETCH

(71) Applicant: GASEFIS, UAB, Vilnius (LT)

(72) Inventor: Pranas Japertas, Vilnius (LT)

(73) Assignee: GASEFIS, UAB, Vilnius (LT)

( * ) Notice: Subject to any disclaimer, the term of this patent is extended or adjusted under 35 U.S.C. 154(b) by 119 days.

(21) Appl. No.: 18/578,639

(22) PCT Filed: Jul. 14, 2022

(86) PCT No.: PCT/IB2022/056492
§ 371 (c)(1),
(2) Date: Jan. 11, 2024

(87) PCT Pub. No.: WO2023/286003
PCT Pub. Date: Jan. 19, 2023

(65) Prior Publication Data
US 2024/0331007 A1    Oct. 3, 2024

(30) Foreign Application Priority Data

Jul. 14, 2021    (LT) ..................... 2021 535

(51) Int. Cl.
*G06Q 30/00*      (2023.01)
*G06Q 30/0601*    (2023.01)
(Continued)

(52) U.S. Cl.
CPC ..... *G06Q 30/0631* (2013.01); *G06Q 30/0641* (2013.01); *G06V 10/40* (2022.01); *G10L 15/18* (2013.01); *G10L 2015/088* (2013.01)

(58) Field of Classification Search
CPC ................................................. G06Q 30/0631
See application file for complete search history.

(56) References Cited

U.S. PATENT DOCUMENTS 11,532,024 B2 * 12/2022 Chen ..................... G06F 16/58
11,804,035 B2 * 10/2023 Kale ................... G06V 10/758
(Continued)

OTHER PUBLICATIONS

Kovashka, Adriana, Devi Parikh, and Kristen Grauman. "Whittlesearch: Image search with relative attribute feedback." 2012 IEEE Conference on Computer Vision and Pattern Recognition. IEEE, 2012.*

(Continued)

*Primary Examiner* — Kathleen Palavecino
(74) *Attorney, Agent, or Firm* — Koivula & Somersalo, LLC

(57) ABSTRACT

The disclosure relates to the fields of electronic processing of images and e-commerce, specifically—to the visual search with feedback loop based on interactive sketch for transparency and user control. Presented method adds transparency and user control to the traditionally "black-box" visual search process by introducing a feedback loop, based on interactive sketch. The method comprises of following main steps: submission of an information about the object being searched for by the user (in a form of image, written text, spoken text or selection of product category from menu in GUI), identification of product attributes and verification of identified attributes against the ontology rules, selection of building blocks from database for filtered attributes, connection of selected blocks to form a sketch of object being searched for, application of projection rules to produce a form vector, comparison of vector from previous step with database, presenting user with interactive sketch of product alongside the list of matching products from database, enabling user to select a part of the object in sketch, presenting user with possible modifications for the selected part of the object, enabling user to select needed modification and re-iterate the search process as many times as needed, until the wanted results are achieved.

8 Claims, 3 Drawing Sheets

(51) Int. Cl.
*G06V 10/40* (2022.01)
*G10L 15/18* (2013.01)
*G10L 15/08* (2006.01)

(56) References Cited

U.S. PATENT DOCUMENTS

| | | |
|---|---|---|
| 2007/0067279 A1 | 3/2007 | Bonabeau et al. |
| 2008/0177640 A1 | 7/2008 | Gokturk et al. |
| 2012/0054177 A1 | 3/2012 | Wang et al. |
| 2014/0337370 A1 | 11/2014 | Aravamudan et al. |
| 2016/0239898 A1* | 8/2016 | Bhardwaj ............... G06F 18/24 |
| 2016/0267569 A1* | 9/2016 | Hampson .............. G06F 16/248 |
| 2019/0205333 A1 | 7/2019 | Piramuthu et al. |
| 2019/0286647 A1* | 9/2019 | Jin .......................... G06F 18/40 |
| 2021/0004589 A1* | 1/2021 | Turkelson ............ G06V 10/809 |

OTHER PUBLICATIONS

Hu et al., A Survey on Visual Content-Based Video Indexing and Retrieval, IEEE Transactions on Systems, Man, and Cybernetics—Part C: Applications and Reviews, vol. 41, No. 6, Nov. 2011.
International Search Report and Written Opinion issued in PCT/IB2022/056492, mailed Jan. 19, 2023.

* cited by examiner

VISUAL SEARCH METHOD WITH FEEDBACK LOOP BASED ON INTERACTIVE SKETCH

CROSS REFERENCES

This is a U.S. national stage filing of the international application number PCT/IB2022/056492 filed on Jul. 14, 2022 and claiming priority to Lithuanian national application LT2021535 filed on Jul. 14, 2021.

FIELD OF THE INVENTION

The disclosure relates to the fields of electronic processing of images and e-commerce, specifically—to the visual search method with feedback loop, based on interactive sketch, for transparency and user control. Further in the document this particular invention will be referred to as INVENTION (all capitals).

DESCRIPTION OF THE RELATED ART

Traditionally visual search is a "black box" process—there is little control over it. After user inputs initial information, he just receives results on the other end. If search results are unsatisfactory-clear cause for that is not clear to the user. And there is nothing user can do in order to improve the results. There were multiple attempts to improve this problematic situation, but none of discovered existing patent applications provide the level of user control and over the search process, as the INVENTION.

A patent application U.S. Pat. No. 8,412,594B2 (published on Apr. 2, 2013) discloses a method that provides possibility to select a first silhouette image of an item at a client machine depicting a plurality of silhouette images representing aspects of the item such as style, length type and sleeve type. Selecting any of those aspects allows a server to search a database for listings of similar items that have those aspects. Concurrently selecting one or more of the images representing those aspects and one or more sizes, allows a server to search a database for listings of similar items that have those aspects and those sizes. Although described method provides possibility to select images as search parameters, it lacks the feedback loop, which is essential part of INVENTION.

A patent application US20160239898A1 (published on Aug. 18, 2016) discloses a system and method for sketch based queries. A sketch of a search item is received from a user device. An item attribute corresponding to a physical attribute of the search item is extracted from the sketch. Inventory items are identified based on the extracted item attribute. The identified inventory items are presented to the user. A modification to the sketch of the search item is received and the inventory items are updated based on the received modification. Although method described in this patent application assumes multiple iterations of search query, each iteration is essentially a separate query, starting with new (modified) image. User does not modify the results in a systematic and controlled manner, like in the INVENTION, but performs a new search with manually modified sketch. Also this invention only allows a sketch as a source data for initial search query, while INVENTION also allows a photograph, textual or voice description and product category selection from menu list in user interface.

A patent application US20180108066A1 (published on Apr. 19, 2018) discloses systems, methods, and computer program products for identifying a relevant candidate product in an electronic marketplace. Embodiments perform a visual similarity comparison between candidate product image visual content and input query image visual content, process formal and informal natural language user inputs, and coordinate aggregated past user interactions with the marketplace stored in a knowledge graph. Visually similar items and their corresponding product categories, aspects, and aspect values can determine suggested candidate products without discernible delay during a multi-turn user dialog. The user can then refine the search for the most relevant items available for purchase by providing responses to machine-generated prompts that are based on the initial search results from visual, voice, and/or text inputs. An intelligent online personal assistant can thus guide a user to the most relevant candidate product more efficiently than existing search tools. Although method described in this patent application allows multiple formats of initial data for search (text, voice and image) and implies multiple iteration of search, the principal of how the criteria for new search iteration is obtained is very different from the one described in the INVENTION. Here modification of the search query is fully based on AI driven virtual assistant, which provides textual questions/suggestions to the user and based on user answers to those questions/suggestions new iterations of search are executed. Essential difference from INVENTION is that here AI based virtual assistant drives the modification of the search, while in INVENTION-end user is fully in charge of which part of search query should be modified and how. Also INVENTION provides unique fully visual way for user to choose the modification of the object to be searched for, while in this patent application interaction between end user and the system is text based.

SUMMARY OF THE INVENTION

The disclosure presents a visual search method with feedback loop, based on interactive sketch, for transparency and user control. The presented method adds a feedback loop that makes process transparent and also adds user control. A visual representation of how visual search algorithm perceives initial input data is presented to the user. Object in the image is presented as schematic drawing (sketch) to have greater generalization power, yet being able to retain important specifics about an object being searched for. This visual representation of an object is also being interactive, i.e. user can manipulate this schematic drawing and therefore affect the search performed. User is not restricted on how many interactions (corrections) can be made—each interaction with the schematic drawing would have corresponding results presented. Interactive schematic drawing that user can manipulate serves several purposes:
  clearly presents to user current query (what algorithm is currently searching for) providing transparency,
  allows user to make hybrid searches-starting with the image, but then modifying it and arriving at the results that would not be possible with standard reverse image search.

Example workflow: user has a photo of an object that is close to the object he really wants to find; user submits an image, object in the image is recognized and is presented to the user in form of an interactive sketch; user makes needed changes on the schematic drawing so the schematic drawing would better match his/hers expectations (fine tunes the query) until user is happy with the results (objects retrieved from the database).

The method comprises of following steps: an introduction of the input interface to input specifications about he object (in a form of image and/or text, and/or voice recording, and/or product category selection), identification of product attributes by the object recognition models, checking of identified attributes against the ontology rules, selection of building blocks from database for filtered attributes, connection of selected blocks to form a schematic drawing, application of projection rules to produce a form vector, comparison of vector from previous step with database, presenting schematic drawing to the user, enabling user to select a part of the object in schematic drawing, retrieve possible modifications for the selected part of an object, retrieve of matching building blocks taken from database, enabling user to choose an alternative presented to him for the selected part/attribute.

DETAILED DESCRIPTION

Figure 1:
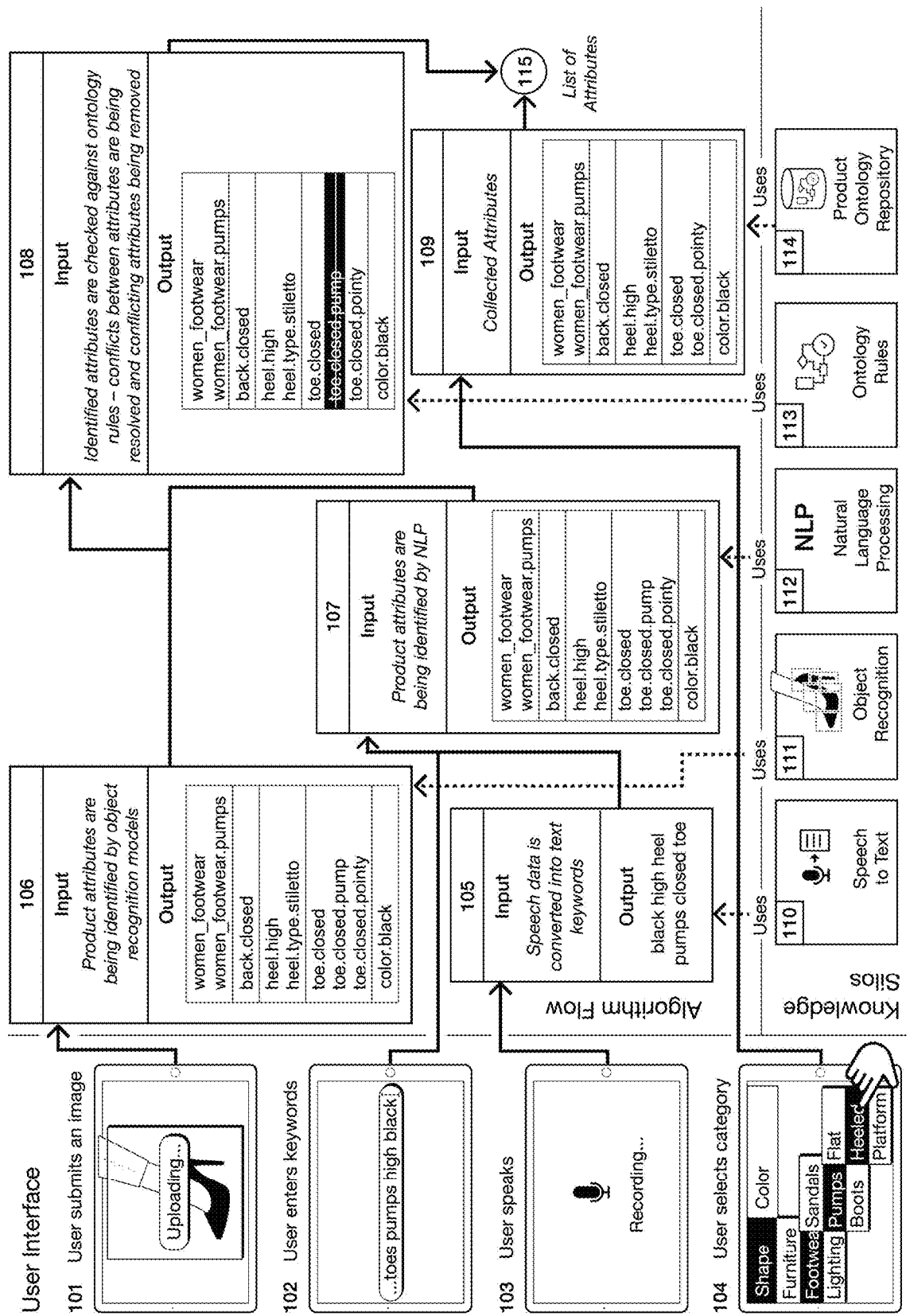
FIG. 1. Schematically illustrates the method structure (Steps S1.1/S2.1/S3.1/S4.1-S3).
Figure 2:
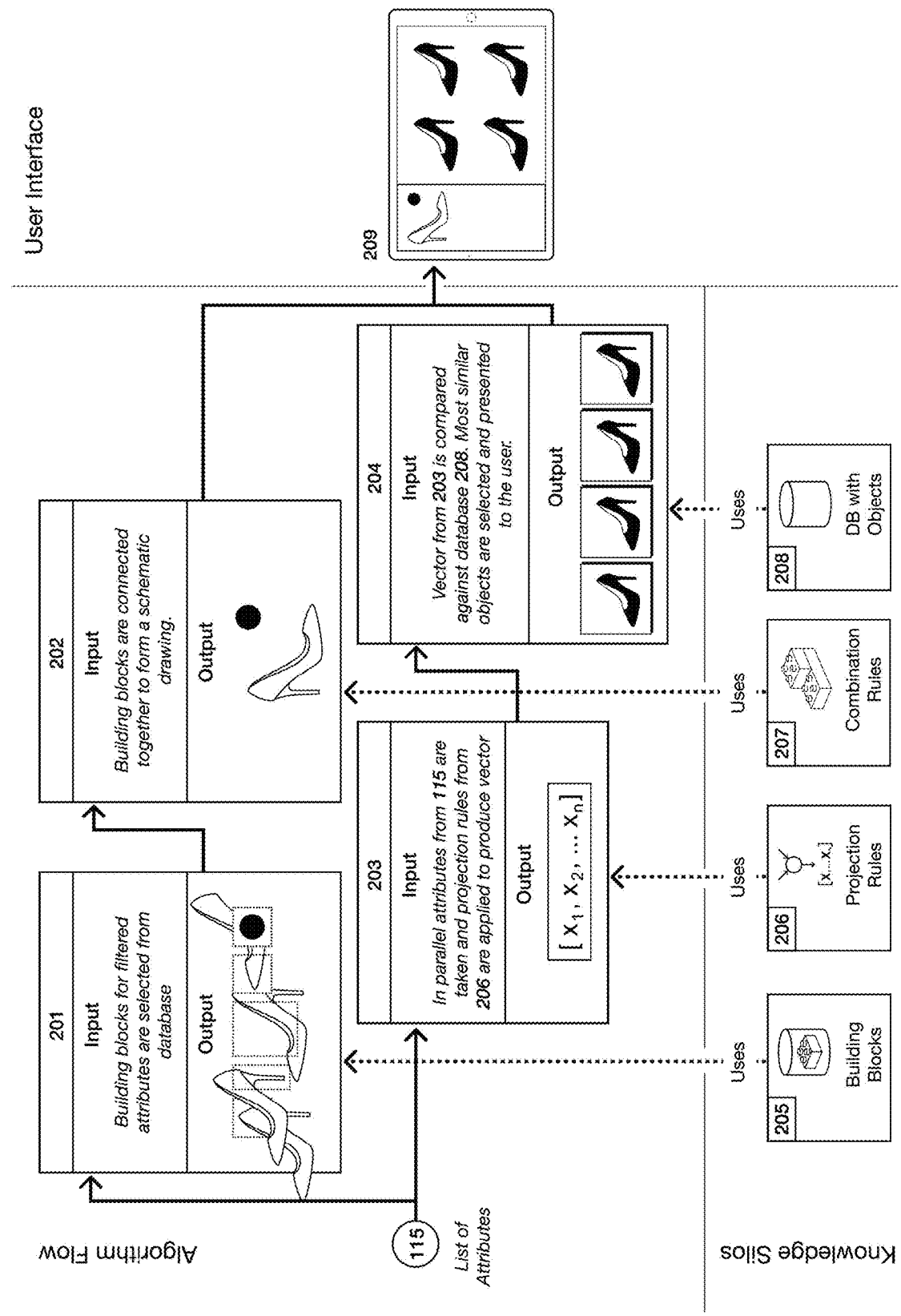
FIG. 2. Schematically illustrates the method structure (Steps S4-S8).
Figure 3:
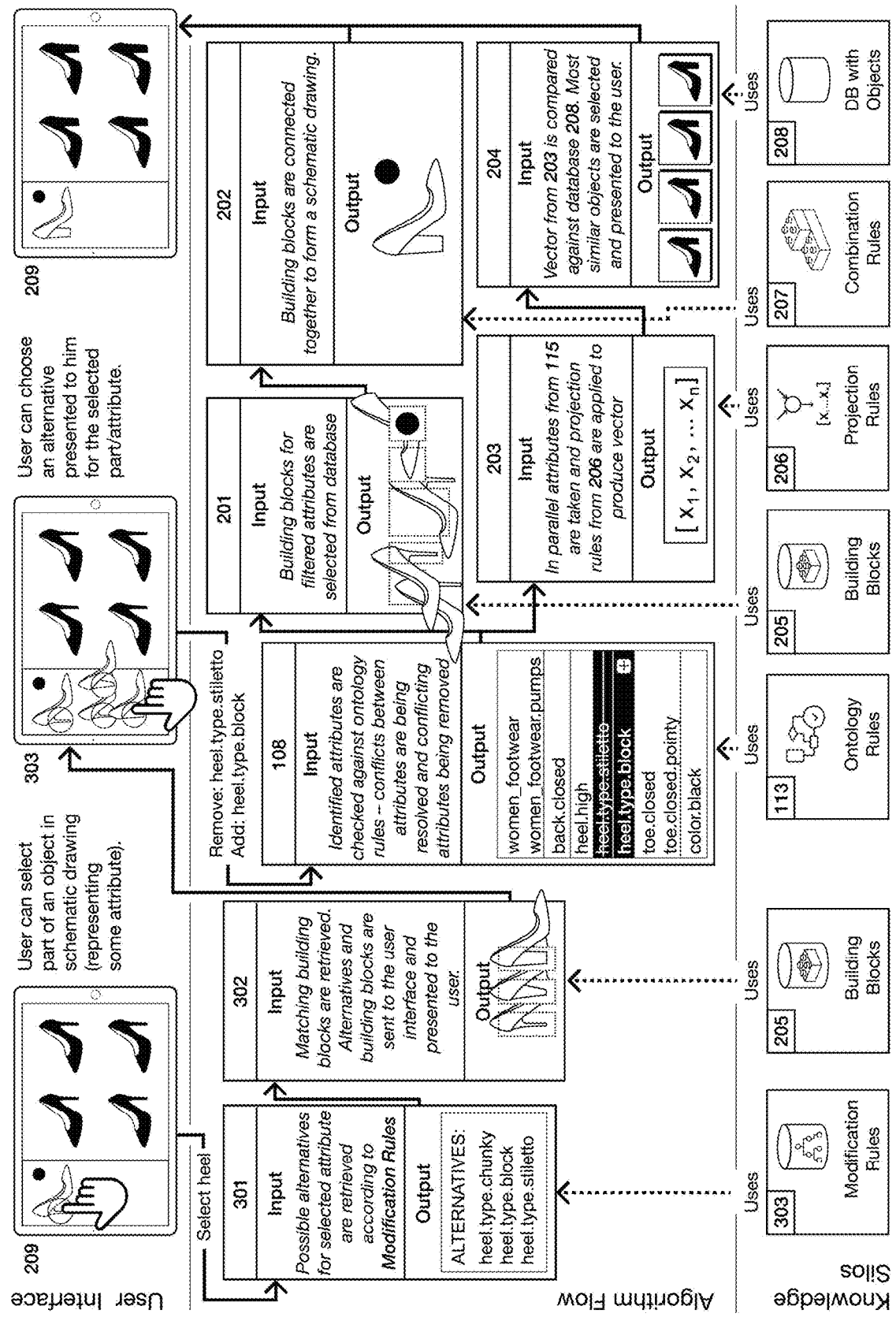
FIG. 3 Schematically illustrates the method structure (Steps S9-S12, including loop back to S3-S8).

The disclosure presents the method for the visual search with feedback loop, based on interactive sketch, for transparency and user control. The method comprises of several steps. Search process begins with user providing initial information about the object that is being searched for. The input interface is introduced to input specifications about the object. This information can come in several different forms:
 a) an image wherein an object is presented as picture or schematic drawing (101).
 b) Set of typed keywords, best describing the object (102)
 c) Set of spoken keywords (voice recording), best specifying the object (103).
 d) Specific product category, which is selected from menu of user-interface (104).

These alternative ways of initial information about the object being searched for allow for greatest possible applicability of invention in different situations and usage scenarios.

Each form of initial information suggests different beginning of search process, so each case will be described in detail.

Scenario 1—Image is Provided as Initial Information

S1.1. At first step (101) user submits a picture or schematic drawing (sketch) of a product which is being searched for.

S1.2. In the following step (106), product attributes are being identified by the object recognition models (111) that are responsible for recognizing different attributes in the provided image.

S1.3. In further step (108), identified attributes are checked against ontology rules (113)—conflicts between attributes are resolved and conflicting attributes are removed. In this case, the product ontology rules (113) serve as a first pass filter for the identified attributes.

S3. List of selected attributes (115) is ready for further steps.

Scenario 2—Typed Keywords are Provided as Initial Information

S2.1. At first step (102) user submits typed keywords, describing the product that is being searched for.

S2.2. In the following step (107), product attributes are being identified by NLP (Natural Language Processing) engine (112) which is responsible for recognizing different product attributes from the provided keywords.

S2.3. In further step (108), identified attributes are checked against ontology rules (113)—conflicts between attributes are resolved and conflicting attributes are removed. In this case, the product ontology rules (113) serve as a first pass filter for the identified attributes.

S3. List of selected attributes (115) is ready for further steps.

Scenario 3—Spoken Keywords are Provided as Initial Information

S3.1. At first step (103) user submits a verbal description (words), describing the product that is being searched for.

S3.2. In the following step (105), voice speech input is processed by Speech Recognition (Speech To Text) engine (110), which is responsible for reliably converting voice data into text data.

S3.3. In the following step (107), product attributes are being identified by NLP (Natural Language Processing) engine (112) which is responsible for recognizing different product attributes from the provided keywords.

S3.4. In further step (108), identified attributes are checked against ontology rules (113)—conflicts between attributes are resolved and conflicting attributes are removed. In this case, the product ontology rules (113) serve as a first pass filter for the identified attributes.

S3. List of selected attributes (115) is ready for further steps.

Scenario 4—Product Category is Provided as Initial Information

S4.1. At first step (104) user selects a product category to be searched for from a menu in user interface.

S4.2. In the following step (109), product attributes applicable for selected product category are being collected from Products Ontologies Repository (114).

S3. List of selected attributes (115) is ready for further steps.

S4. In the next step (201), building blocks for filtered attributes are selected from database (205).

S5. In the following step (202), the selected building blocks are connected together to form a schematic drawing wherein the block combination rules (207) are used. In this step, the schematic drawing is presented to the user.

S6. In the next step (203), attributes from S1.4, S2.4, S3.5 or S4.3 are taken in parallel and projection rules (206) are applied to produce a vector. The mentioned projection rules (206) are a mixture of knowledge-based rules with some data learned about the user to better reflect personal preference. In this case, projection rules (206) refer from attribute space to some Euclidean space in order to reflect the similarity best.

S7. In the following step (204), the vector from step S6 (203) is compared with database (208) wherein the actual objects and corresponding attributes are located.

S8. At this step (209), user is presented with a schematic drawing of the object being search for alongside the list of matching objects from a database.

At this point user has a full control on search process as he can modify the presented schematic drawing. User can perform his actions in several possible ways:
 a) By using a mouse and selecting/clicking on the sketch in graphical user interface and selecting alternative options (this option is further used in drawings and description).

b) By typing in commands, which specify user action (which part of sketch should be selected and changed)

c) By speaking out commands, which specify user actions (which part of sketch should be selected and changed)

This action further requires the following steps:

S9. At this step (209), user selects (using alternative method "a)" described in S8) a part of the object in schematic drawing (representing some attribute).

S10. In the next step (301), modifications are retrieved for the selected attribute under question. A database with modification rules (303) is used for this reason. It describes possibilities for attribute modification and can be curated (knowledge-based) or learned from analysis of real-world objects.

S11. In the following step (302), matching building blocks taken from database (205) are retrieved. Alternatives and building blocks are sent to the user interface and presented to the user.

S12. In this step (303), the user can choose (using one of alternative methods described in S7) an alternative presented to him for the selected part/attribute.

The change of attributes is passed back to algorithm. After that steps S3-S7 (115, 201-204) are repeated. The steps S8-S12 (209, 301-303) and then steps S3-S7 (115, 201-204) can be repeated as many times as wanted and constitute a control loop for visual search.

The above description of the preferred embodiment is provided in order to illustrate and describe the present invention. This is not an exhaustive or limiting description, seeking to determine the exact form or embodiment. The above description should be considered more like an illustration, rather than a limitation. It is evident that numerous modifications and variations may be obvious to the specialists of that field. Embodiment is chosen and described so that experts of this field would clarify the best way the principles of this invention and the best practical application for various embodiments with various modifications suitable for a particular use of application of the embodiment. It is intended that the scope of the invention is defined in the claim appended thereto and its equivalents, where all of the said terms have meaning within the widest range, unless indicated otherwise.

In the embodiment options described by the specialists of this field changes can be created without deviations from the scope of this invention as specified in the following claims.

The invention claimed is:

1. A computer-implemented visual objects search method, based on interactive sketch, controlled by a user, the method comprising:

(i) generating, by a computer:
an input interface configured to:
select a category and one or more applicable product attributes according to a product ontologies repository of a searchable visual object, and/or
entering a visual object specification convertible to the category, and the one or more applicable product attributes;
obtaining, from the user, at a generated input interface:
the category and the one or more applicable product attributes of a searched visual object according to the product ontologies repository, and/or
a specification of a searched visual object, and further converting the specification, by the computer, using one or more product ontology rules, thereby obtaining the object category and the one or more attributes according to the product ontologies repository;

(ii) generating, by the computer, a visual interactive interface for user's visual-sketch-based control, and further:
retrieving, by the computer, one or more attribute-related visual building blocks of a searchable visual object/category from a database,
composing, by the computer, the selected one or more visual building blocks to form a schematic sketch of the searchable visual object/category, using one or more combination rules of said one or more attribute-related visual building blocks;
applying, by the computer, one or more projection rules to the obtained object's attributes, to produce a vector for at least one attribute,
matching, by the computer, the user's provided object category and the one or more attributes with said vector for at least one attribute against the database-comprised visual objects having their attributes, and retrieving the matched objects from the database;
presenting, by the computer, in a user's visual interface:
the composed schematic sketch of the searchable visual object; and
the retrieved matched visual objects; and further (iii) providing, by the computer, in the user's visual interface, a user's control means, configured for modifying the presented schematic sketch of the searchable visual object, by:
receiving, from the user, a selection on a visual building block in the presented schematic sketch,
presenting, by the computer, for the selected visual building block, one or more alternative attribute options available according to modification rules of said visual building block/attribute,
selecting, by the user, to update the selected visual building block/attribute according to the one or more presented attribute alternative options;
updating, by the computer, the schematic sketch of the searchable object with the selected visual building block;
presenting, by the computer, the updated schematic sketch of the searchable object; and
resolving, by the computer, the updated visual building block to object attributes according to the product ontology rules, thereby obtaining the updated searchable object's category and attributes for further interactive search iterations.

2. The method according to claim 1, wherein the user's provided specifications of the searchable visual object is presented as any one of: a picture, typed keywords, and/or spoken keywords.

3. The method according to claim 1, wherein identification of the searchable visual object attributes in the visual object specification is performed by one or more image recognition models configured for recognizing different attributes of the visual object in the provided image.

4. The method according to claim 1, wherein converting speech data into text keywords is performed using Speech To Text recognition engine configured for converting voice data into text data.

5. The method according to claim 1, wherein identification of visual object attributes is performed by Natural Language Processing means configured for recognizing different product attributes from provided keywords.

6. The method according to claim 1, wherein the product ontology rules serve as a first pass filter for the identified attributes of the searchable visual object.

7. The method according to claim 1, wherein visual object attribute projection rules are composed of knowledge-based rules with the data learned about the user.

8. The method according to claim 1, wherein projection rules are a mixture of knowledge-based rules with the data learned about the user.

* * * * *